US010209391B2

(12) United States Patent
Arro

(10) Patent No.: US 10,209,391 B2
(45) Date of Patent: Feb. 19, 2019

(54) SIMULTANEOUS INVERSION OF NMR MULTIPLE ECHO TRAINS AND CONVENTIONAL LOGS

(71) Applicant: Julio Roberto Arro, Spring, TX (US)

(72) Inventor: Julio Roberto Arro, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 139 days.

(21) Appl. No.: 15/244,216

(22) Filed: Aug. 23, 2016

(65) Prior Publication Data

US 2018/0059281 A1    Mar. 1, 2018

(51) Int. Cl.
    *G01V 3/00*      (2006.01)
    *G01V 3/38*      (2006.01)
    *G01V 3/32*      (2006.01)

(52) U.S. Cl.
    CPC .  *G01V 3/38* (2013.01); *G01V 3/32* (2013.01)

(58) Field of Classification Search
    CPC ... G01V 3/28; G01V 3/38; G01V 3/18; G01V 3/20; G01V 3/22; G01V 3/24; G01V 3/26; G01V 3/30; G01V 3/10; G01V 3/265; G01V 3/02; G01V 3/04; G01V 3/06; G01V 3/104; E21B 47/026; E21B 47/122; E21B 47/0905; E21B 47/09; E21B 47/011; E21B 47/12; E21B 47/101; E21B 47/102; G01N 27/223; G01N 33/246; G01R 27/18; G01R 27/20; G01R 33/34; G01R 33/34007; G01R 33/36; G01R 33/3635; G01R 33/3642; G01R 33/48; G01R 33/4818;

(Continued)

(56) References Cited

U.S. PATENT DOCUMENTS

| 4,413,512 A | 11/1983 | Zemanek, Jr. et al. |
| 5,498,960 A | 3/1996 | Vinegar et al. |

(Continued)

FOREIGN PATENT DOCUMENTS

| EP | 1672392 B1 | 10/2009 |
| WO | 2015094306 A1 | 6/2015 |

OTHER PUBLICATIONS

Fang et al.; "Quantification of Hydrocarbon Saturation in Carbonate Formations Using Simultaneous Inversion of Multiple NMR Echo Trains"; SPE90569; 2004; Society of Petroleum Engineers Inc.; 12 pages.

(Continued)

*Primary Examiner* — Thang Le
(74) *Attorney, Agent, or Firm* — Cantor Colburn LLP

(57) ABSTRACT

A method for estimating one or more properties as a function of depth of an earth formation penetrated by a borehole includes: receiving nuclear magnetic resonance (NMR) logging data having NMR echo trains as a function of depth in the borehole; receiving non-NMR logging data having non-NMR measurement values for one or more types of non-NMR measurements as a function of depth in the borehole; generating an evolution matrix (E) representing a mathematical relationship between the one or more properties in property matrix (P) to be estimated and the NMR logging data and non-NMR logging data matrix (M); generating a matrix equation of the form M=E·P; and inverting the matrix equation to estimate the one or more properties as a function of depth.

16 Claims, 10 Drawing Sheets

(58) Field of Classification Search
CPC .............. G01R 33/481; G01R 33/4824; G01R 33/446; G01R 33/4835; G01R 33/4828; G01R 33/54; G01R 33/543; G01R 33/561; G01R 33/563; G01R 33/565; G01R 33/5611; G01R 33/5612; G01R 33/583; G01R 33/5659; G01R 33/56518; G01R 33/56536; G01R 33/56572; G01R 33/5614; G01R 33/5616; G01R 33/56509; G01R 33/341; G01R 33/385; G01R 33/56358; A61B 5/055; A61B 5/0555; A61B 5/7278; A61B 5/725

See application file for complete search history.

(56) References Cited

U.S. PATENT DOCUMENTS

| | | | |
|---|---|---|---|
| 6,072,314 A | 6/2000 | Oraby | |
| 6,140,816 A | 10/2000 | Herron | |
| 7,253,617 B1* | 8/2007 | Chen | G01N 24/081 324/300 |
| 7,733,086 B2* | 6/2010 | Prammer | G01V 3/32 324/300 |
| 8,115,481 B2* | 2/2012 | Chen | G01N 24/081 324/303 |
| 2002/0153888 A1 | 10/2002 | Kruspe et al. | |
| 2003/0070480 A1 | 4/2003 | Herron et al. | |
| 2006/0158184 A1 | 7/2006 | Edwards | |
| 2008/0234937 A1 | 9/2008 | Fang et al. | |
| 2009/0189604 A1 | 7/2009 | Romero | |
| 2010/0315081 A1 | 12/2010 | Chanpura et al. | |
| 2011/0054795 A1* | 3/2011 | Klein | G01V 3/32 702/7 |
| 2013/0103319 A1 | 4/2013 | Buiting et al. | |
| 2013/0211725 A1* | 8/2013 | Chen | G01V 3/14 702/12 |
| 2013/0214779 A1* | 8/2013 | Tietjen | G01V 3/32 324/303 |
| 2014/0320126 A1 | 10/2014 | Heaton et al. | |
| 2015/0168585 A1 | 6/2015 | Bennett et al. | |

OTHER PUBLICATIONS

Roberto, et al.; "Simultaneous Inversion of NMR Multiple Echo Train Data Incorporating Conventional Logs"; SPWLA 57th Annual Logging Symposium, Jun. 25-29, 2016; 11 pages.

International Search Report and the Written Opinion of the International Searching Authority, or the Declaration; PCT/US2017/047504; dated Nov. 23, 2017; 8 pages.

* cited by examiner

Transversal Magnetization Evolution $$M(j) = \sum_{k=1}^{K} P_k \, E(j,k) + \varepsilon_j, \quad j=1,2,\ldots,J \quad \text{Single Experiment, Single Fluid}$$

$$M(j) = \sum_{\alpha=w,o,g} \left[ \sum_{k=K_{s,\alpha}}^{K_{e,\alpha}} P_{k,\alpha} \, E(j,k,\alpha) \right] + \varepsilon_j, \quad j=1,2,\ldots,J \quad \text{Single Experiment, Multiple Fluids}$$

$$M(i,j) = \sum_{\alpha=w,o,g} \left[ \sum_{k=K_{s,\alpha}}^{K_{e,\alpha}} P_{k,\alpha} \, E(i,j,k,\alpha) \right] + \varepsilon_{i,j}, \quad i=1,2,\ldots,I, \quad j=1,2,\ldots,J_i \quad \begin{array}{l}\text{Multiple Experiments,}\\\text{Multiple Fluids}\end{array}$$

$$\{P_{k,\alpha}, \; \alpha=w,o,g; \quad k=K_{s,\alpha},\ldots,K_{e,\alpha}\} \quad \text{Intrinsic T2 spectra}$$

FIG.5

$$\bar{\bar{M}} = \bar{\bar{E}} \cdot \bar{\bar{P}} + \varepsilon$$

Matrix Representation of NMR and Conventional Logs Forward Models $$\hat{\bar{P}} = (\bar{\bar{E}}^t W \bar{\bar{E}} + \beta V^t V)^{-1} \bar{\bar{E}}^t W \bar{\bar{M}}$$

Weighted Least Squares Solution of the Integrated Inversion Problem $$\bar{\bar{P}} = \begin{bmatrix} P_w \\ P_o \\ P_g \\ V_m \end{bmatrix}$$

$$\bar{\bar{E}} = \begin{bmatrix}
E_{w,1} & E_{o,1} & E_{g,1} & 0 \\
E_{w,2} & E_{o,2} & E_{g,2} & 0 \\
\vdots & & & \vdots \\
E_{w,I-1} & E_{o,I-1} & E_{g,I-1} & 0 \\
E_{w,I} & E_{o,I} & E_{g,I} & 0 \\
\hline
\sqrt{C_w}u_w & \sqrt{C_o}u_o & \sqrt{C_g}u_g & \sqrt{C_m} \\
\rho_w u_w & \rho_o u_o & \rho_g u_g & \rho_m \\
\Delta t_w u_w & \Delta t_o u_o & \Delta t_g u_g & \Delta t_m \\
R_w u_w & R_o u_o & R_g u_g & R_m
\end{bmatrix}$$

NMR Related Matrix / Conventional Logs Related Matrix $$\bar{\bar{M}} = \begin{bmatrix} M_1 \\ M_2 \\ \vdots \\ M_{I-1} \\ M_I \\ \sqrt{C} \\ \rho \\ \Delta t \\ \vdots \\ R \end{bmatrix}$$

FIG.8

SIMULTANEOUS INVERSION OF NMR MULTIPLE ECHO TRAINS AND CONVENTIONAL LOGS

BACKGROUND

Earth formations may be used for various purposes such as hydrocarbon production, geothermal production and carbon dioxide sequestration. In order to efficiently use the formations, measurements are typically performed on the formations using sensors or tools disposed in boreholes penetrating the formations.

Measurement data from a sensor may be inverted using an inversion algorithm in order to estimate parameters of a mathematical model of the earth formation from which the measurement data was obtained. That is, the mathematical model with accurate parameters will provide the same or near measurement data when measurements on the mathematical model of the earth formation using the same type of sensor are simulated. Hence, it would be well received in the drilling industry if inversion algorithms and methods were developed to invert sensor data in order to more accurately estimate parameters of a mathematical model that represents an earth formation of interest.

BRIEF SUMMARY

Disclosed is a method for estimating one or more properties as a function of depth of an earth formation penetrated by a borehole. The method includes: receiving with a processor nuclear magnetic resonance (NMR) logging data comprising NMR echo trains as a function of depth in the borehole; receiving with the processor non-NMR logging data comprising non-NMR measurement values for one or more types of non-NMR measurements as a function of depth in the borehole; generating with the processor an evolution matrix (E) representing a mathematical relationship between the one or more properties in property matrix (P) to be estimated and the NMR logging data and non-NMR logging data matrix (M); generating with the processor a matrix equation of the form M=E·P; and inverting with the processor the matrix equation to estimate the one or more properties as a function of depth.

Also disclosed is a system for estimating one or more properties as a function of depth of an earth formation penetrated by a borehole. The system includes: a carrier configured to be conveyed through the borehole; a nuclear magnetic resonance (NMR) logging tool disposed on the carrier and configured to provide NMR logging data having NMR echo trains as a function of depth in the borehole; a non-NMR tool disposed on the carrier and configured to provide non-NMR logging data having non-NMR measurement values for one or more types of non-NMR measurements as a function of depth in the borehole; and a processor. The processor is configured to: receive the NMR logging data; receive the non-NMR logging data; generate an evolution matrix (E) representing a mathematical relationship between the one or more properties (P) to be estimated and the NMR logging data and non-NMR logging data (M); generate a matrix equation of the form M=E·P; and invert the matrix equation to estimate the one or more properties as a function of depth.

BRIEF DESCRIPTION OF THE DRAWINGS

The following descriptions should not be considered limiting in any way. With reference to the accompanying drawings, like elements are numbered alike:

FIG. 5 depicts aspects of mathematical representations of transversal magnetization (M) evolution for single and multiple experiments and single and multiple fluids;

FIG. 8 depicts aspects of accounting for non-NMR measurements in the inversion;

DETAILED DESCRIPTION

Figure 1:
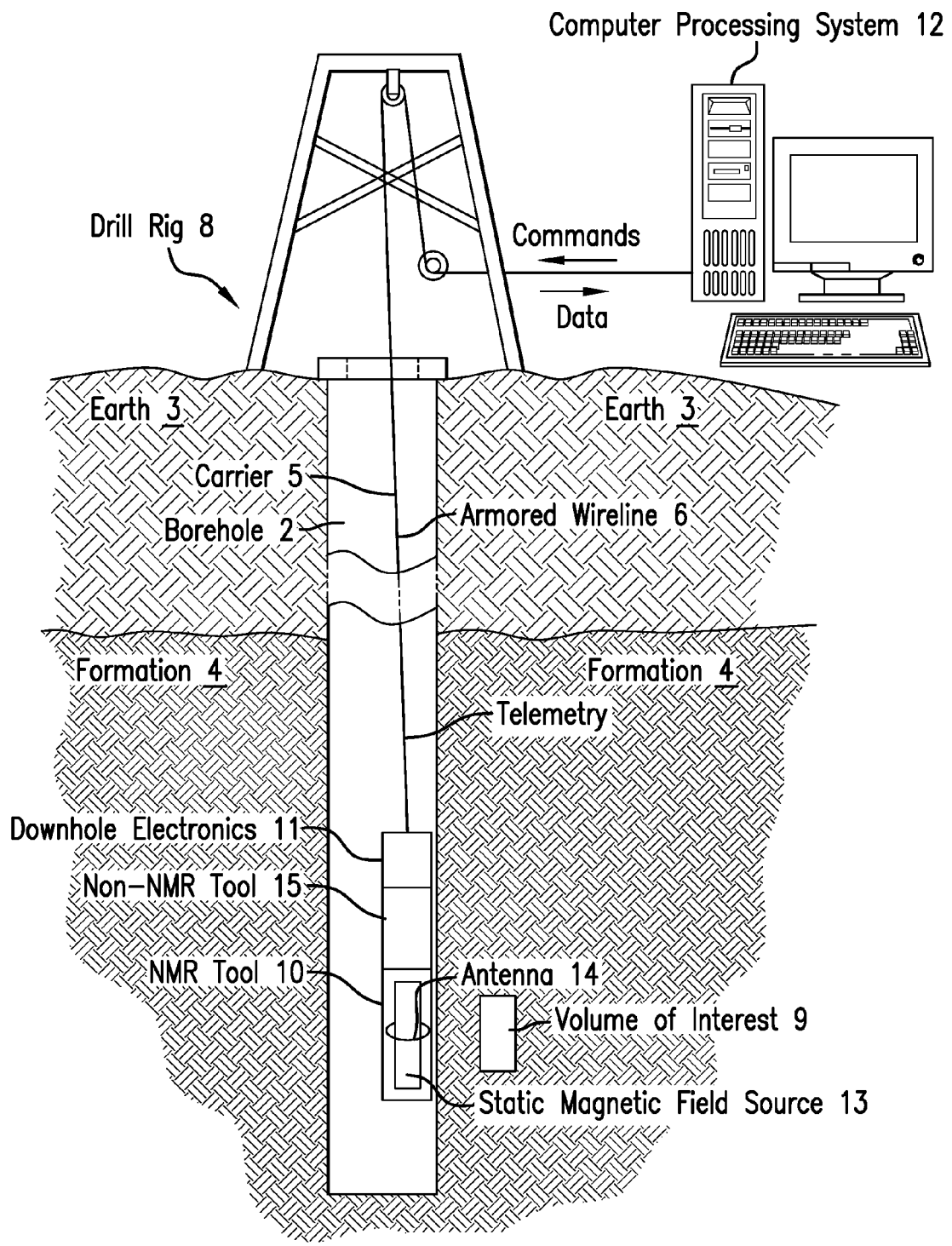
FIG. 1 is a cross-sectional view of an embodiment of a bottomhole assembly (BHA) disposed in a borehole penetrating the earth.

A detailed description of one or more embodiments of the disclosed apparatus and method presented herein by way of exemplification and not limitation with reference to the figures.

Generally speaking, a sought-after petrophysical parameter obtained from NMR (nuclear magnetic resonance) logs is the lithology independent porosity. NMR porosity is not related to lithology but it is related to the fluids Hydrogen Index. By employing simultaneous inversion it is possible to get the porosity corrected by hydrogen index.

All of the inversion processes are very ill conditioned least square problems. It is generally always necessary to use regularization to get stable solutions and the amount of necessary regularization is noise dependent. Normally results are good only in large porosities.

In low porosities as in tight sand and shale, the porosity from conventional logs is not well defined because it is always obtained as a difference between the measured parameter and a matrix parameter. When the porosity approaches to zero, the difference approaches to zero too, the errors in the porosity trend to infinite. The error is not only related to measure errors, it is also related to the error in the knowledge of the matrix parameter. NMR porosity errors can be decreased by reducing the acquisition noise and they are not related to the matrix parameters. NMR is the only technology able to get reliable porosity when the porosity is low or when matrix parameters are not well known.

Disclosed are methods, which may be implemented as algorithms by a processor, for inversion of measurement data obtained from downhole tools. The methods call for simultaneous inversion of measurement data obtained from a downhole nuclear magnetic resonance (NMR) tool and from other types of downhole tools (i.e., non-NMR tools)

known in the art. The simultaneous inversion of these types of measurement data provides more accurate estimates of one or more properties of an earth formation from which the measurement data was obtained than conventional inversion methods. Each of the properties of interest has a defined mathematical relationship with an NMR measurement value and one or more types of non-NMR measurement values. The multiple mathematical relationships for each property in the simultaneous inversion provides for the increase in accuracy of the estimates of the one or more properties of interest by simultaneously satisfying multiple independent constraints. The use of conventional logs in penalty equations in place of or in addition to regularization is disclosed to improve quantification of fluids in one-dimensional (1D) inversion. Accordingly, the quantification of fluids is improved and a more accurate porosity value can be computed. If the fluids in the reservoir are known, then one-dimensional inversion is normally used to quantify the fluid volumes in the NMR measured zone. If the fluids are unknown, then two-dimensional and/or three-dimensional inversion are used to typify and quantify fluids. Parameters related to fluids of interest include T2 (normally a spectrum of values), diffusion constant D and T1/T2 ratio, R. If R and D are known, T2 spectrum is just the unknown. This inversion is called 1D inversion. If R or D is known, the unknowns will be T2-D or T2-R. This inversion is called 2D inversion and the output is a spectrum in two dimensions, which may be presented as a map. If T2, R and D are unknowns, then the inversion is called 3D inversion and the output is a three dimensional spectrum.

FIG. 1 is a cross-sectional view of an embodiment of an NMR tool 10 and a non-NMR tool 15 disposed in a borehole 2 penetrating the earth 3, which includes an earth formation 4. The downhole tools 10 and 15 are conveyed through the borehole 2 by a carrier 5, which can be an armored wireline 6. Besides supporting and conveying the downhole tools 10 and 15 in the borehole 2, the armored wireline 6 can include electrical conductors for conveying electrical signals between the downhole tools 10 and/or 15 and a surface receiver such a computer processing system 12 in real time. A rig 8 is configured to conduct borehole-related operations such as conveying the carrier 5 through the borehole 2 as a non-limiting example.

The NMR tool 10 provides an NMR log of data as a function of depth. The non-NMR tool 15 represents one or more downhole non-NMR sensing tools that are configured to provide other non-NMR types of sensing log data as a function of depth. Downhole electronics 11 are configured to operate the NMR tool 10, operate the one or more non-NMR downhole sensing tools 15, process measurement data obtained downhole from any of the downhole tools, and/or act as an interface with telemetry to communicate data or commands between downhole components and the computer processing system 12 disposed at the surface of the earth 3. System operation and data processing operations may be performed by the downhole electronics 11, the computer processing system 12, or a combination thereof. In the embodiment of FIG. 1, the downhole tools 10 and 15 are side tools having components (not shown) configured to urge the tools 10 and 15 to a side of the borehole 2 for performing measurements. In an alternative embodiment, the downhole tools 10 and 15 are centralized tools having components such as a centralizer (not shown) configured to urge the tools 10 and 15 to the center of the borehole 2 for performing measurements.

The NMR tool 10 is configured to perform NMR measurements on the formation 4. NMR measurements are performed in a volume of interest 9. This volume may be torus-shaped, surrounding the NMR tool 10, or, when using a side-looking NMR tool, may be on one side only. The NMR measurements may yield a longitudinal relaxation time constant $T_1$ and a transverse relaxation time constant $T_2$ (or distributions thereof, see below). $T_1$ relates to a time that is characteristic of the amount of time required for magnetic polarization of the hydrogen atoms in the volume of interest. In general, longer wait times (TW) provide more magnetic polarization than shorter wait times. $T_2$ relates to an exponential decay time constant that corresponds to a characteristic or property of the formation 4 material. Transverse relaxation relates to the irreversible loss of phase coherence of individual hydrogen nuclei (=protons) in the formation 4 material while precessing about a static magnetic field during an NMR measurement. There is not one single value of $T_2$ for formation rock but a wide distribution of values lying anywhere between fractions of a millisecond (ms) and several seconds for example. The distributions of $T_1$ and $T_2$ values are principal outputs of the NMR tool 10 and together may be referred to as an NMR log. Components in the NMR tool 10 include a static magnetic field source 13 that magnetizes formation materials and an antenna 14, which may represent one or more antennas, which transmit precisely timed bursts of radio-frequency energy (e.g., a CPMG sequence) that provides an oscillating magnetic field. In a time period between these pulses, the antenna receives a decaying echo signal from those protons that are in resonance with the static magnetic field produced by the static magnetic field source. Because a linear relationship exists between the proton resonance frequency and the strength of the static magnetic field, the frequency of transmitted radio-frequency energy can be tuned to investigate volumes of interest having different diameters around or distances from the NMR tool 10. It can be appreciated that the NMR tool 10 may include a variety of components and configurations as known in the art of NMR. It can be appreciated that the NMR tool 10 may be calibrated to a known micro-porosity and/or other known properties of a subsurface material by analysis or by testing in field or laboratory conditions using subsurface materials having a known micro-porosity and/or other known properties. In that NMR tools are known in the art, specific details of components and configurations of these tools are not discussed in further detail.

The one or more non-NMR downhole sensing tools 15 are configured to sense properties of the formation 4 using principles that are different from NMR. Non-limiting embodiments of the one or more non-NMR downhole sensing tools 15 include radiation bombardment tools that bombard the formation with neutrons and/or gamma rays and detect the resulting radiation in order to estimate density or porosity, natural gamma-ray tools that detect the natural gamma-rays emitted by a formation, acoustic tools that measure the acoustic impedance of a formation, and resistivity tools that measure the resistivity or conductivity of a formation. Gamma-ray logging tools bombard the formation with from a chemical source of gamma-rays. Radiation is scattered back to the logging tool with an intensity dependent on the electron density of the formation material. The density of the formation material can then be extracted from the amplitude of the back-scattered radiation (e.g., gamma-rays). It can be appreciated that the one or more downhole sensing tools 15 may be calibrated to a known property and/or other known properties of a subsurface material by analysis or by testing in field or laboratory conditions using subsurface materials having a known corresponding property. In that these types of downhole sensing tools are known in the art, specific details of components and configurations of these tools are not discussed in further detail.

When data from the one or more non-NMR downhole tools 15 are used in combination with the data from the NMR tool 10 for inversion, the combined data inversion provides a more complete and accurate characterization of the formation 4 than would be possible with any one type of data alone.

Figure 2:
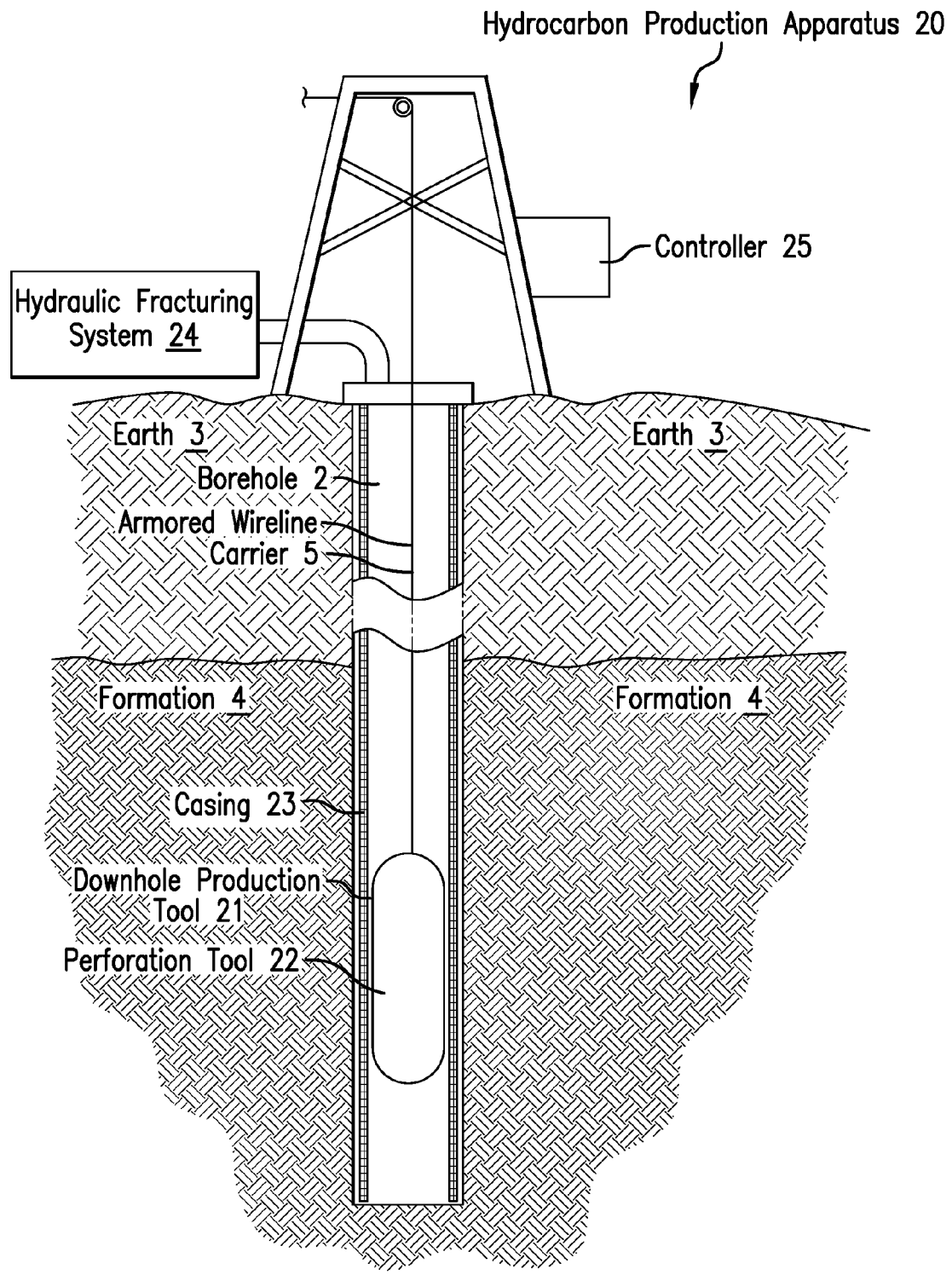
FIG. 2 is a cross-sectional view of hydrocarbon production apparatus configured to perform one or more physical actions related to the production of hydrocarbons using the one or more formation properties as estimated by the methods disclosed herein.

FIG. 2 is a cross-sectional view of hydrocarbon production apparatus 20 configured to perform one or more physical actions related to the production of hydrocarbons using the one or more formation properties as estimated by the methods disclosed herein. The hydrocarbon production apparatus 20 may include a downhole production tool 21 that is configured to be conveyed through the borehole 2 by a carrier, such as an armored wireline, to perform a downhole physical action related to the production of hydrocarbons. In one or more embodiments, the downhole production tool 21 is a perforation tool 22 that is configured to perforate a casing 23 lining the borehole 2. The casing 23 is perforated at a depth or range of depths as determined by the one or more estimated formation properties for the efficient production of hydrocarbons. That is, the depth or range of depths is selected to produce hydrocarbons while excluding the production of water. The hydrocarbon production apparatus 20 may include a hydraulic fracturing system 24. The hydraulic fracturing system 24 is configured to hydraulically fracture the formation 4 at a depth or range of depths as determined by the one or more estimated formation properties. The hydrocarbon production apparatus 20 may include other downhole production tools and/or production systems not shown. The hydrocarbon production apparatus 20 may include a controller 25 configured to accept inputs derived from the one or more estimated formation properties and output a control signal to tools and/or systems for producing hydrocarbons in order to control the tools and/or systems in accordance with one or more estimated formation properties.

Figure 3:
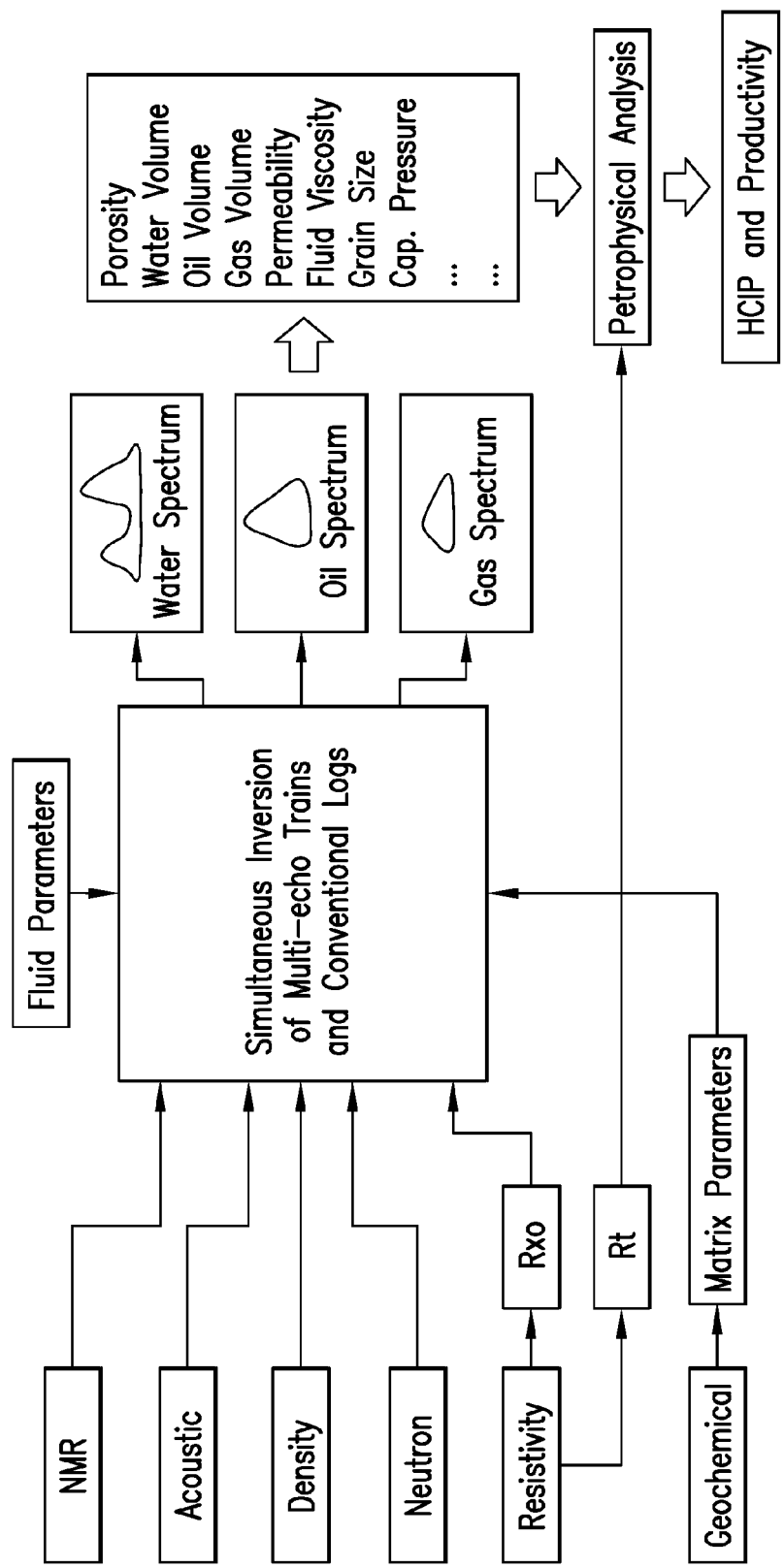
FIG. 3 presents is a flow chart depicting aspects of using known fluid properties, NMR measurements of multiple echo-trains and non-NMR measurements for simultaneous one-dimensional inversion to estimate one or more properties of an earth formation upon which the NMR and non-NMR measurements were performed.

FIG. 3 presents is a flow chart depicting aspects of using known fluid properties, NMR measurements of multiple echo-trains and non-NMR measurements for simultaneous 1D inversion to estimate one or more properties of an earth formation upon which the NMR and non-NMR measurements were performed. Non-limiting embodiments of the one or more properties include porosity, water volume, oil volume, gas volume, permeability, fluid viscosity, grain size and capillary pressure. In that the mathematical relationships between each of the one or more properties to be estimated and the known fluid parameters, NMR measurements and/or non-NMR measurements are known in the art, they are not discussed in further detail. In FIG. 3, Rxo refers to shallow resistivity measurements on the order of less than two inches. Rt refers to deeper resistivity measurements on the order of several feet. From the petrophysical analysis, an amount of hydrocarbons in place and productivity of the formation can be estimated. With this information, well completion tasks can be performed such as determining where to perforate a casing lining the well in order to produce hydrocarbons while excluding the production of water.

Figure 4:
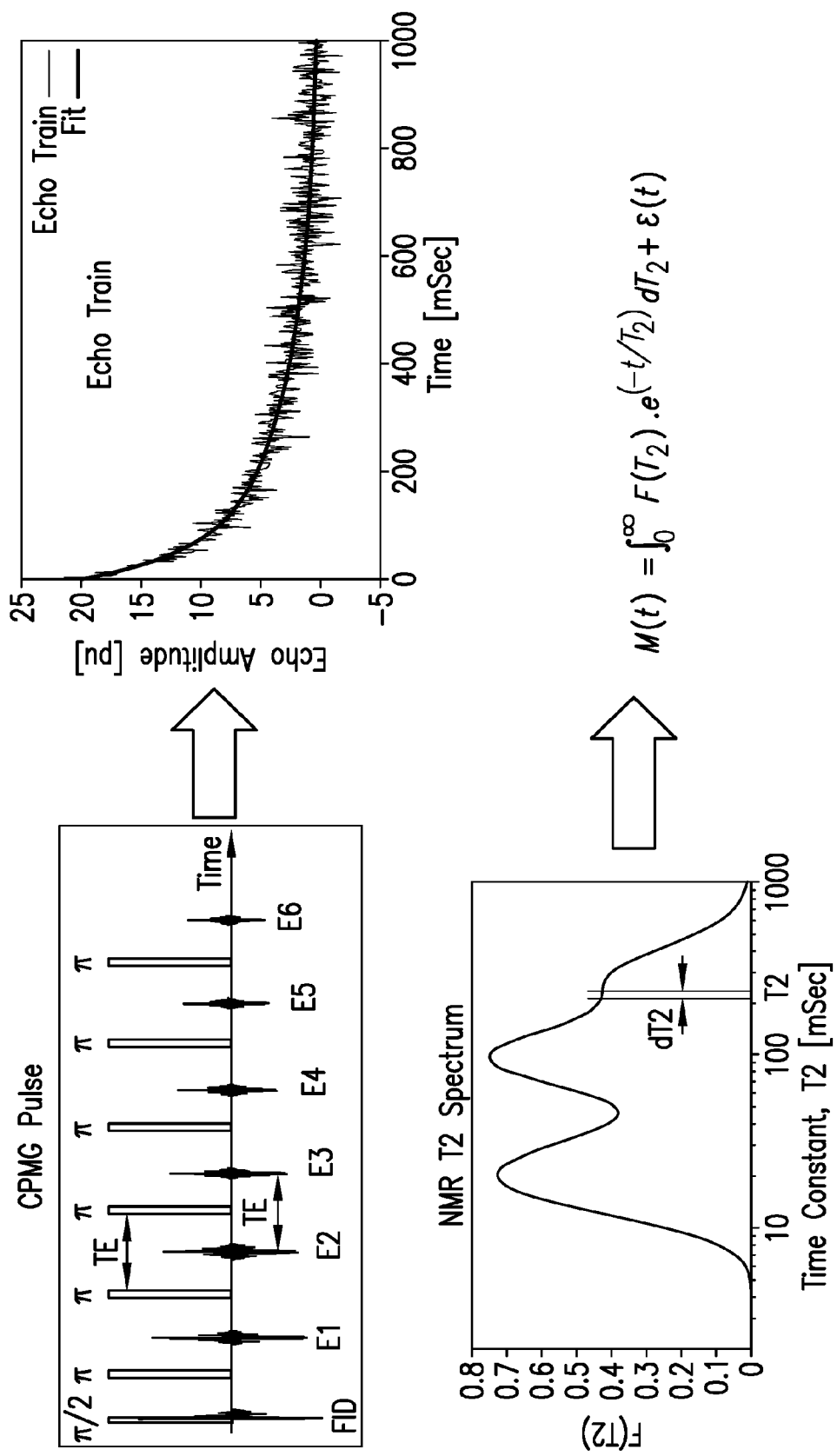
FIG. 4 presents an overview of an NMR inversion process.

FIG. 4 presents an overview of an NMR inversion process. The NMR-CPMG pulse sequence depicted in the upper-left corner results in the measured echo train (M(t)) depicted in the upper-right corner. When the echo train (M(t)) is inverted in accordance with the equation depicted in the lower-right corner where $\varepsilon(t)$ is a noise term (fundamentally thermal noise in a receiver antenna, the NMR T2 spectrum (F(T2)) depicted in the lower-left corner is obtained.

FIG. 5 depicts aspects of mathematical representations of transversal magnetization (M) evolution for single and multiple experiments and single and multiple fluids.

Figure 6:
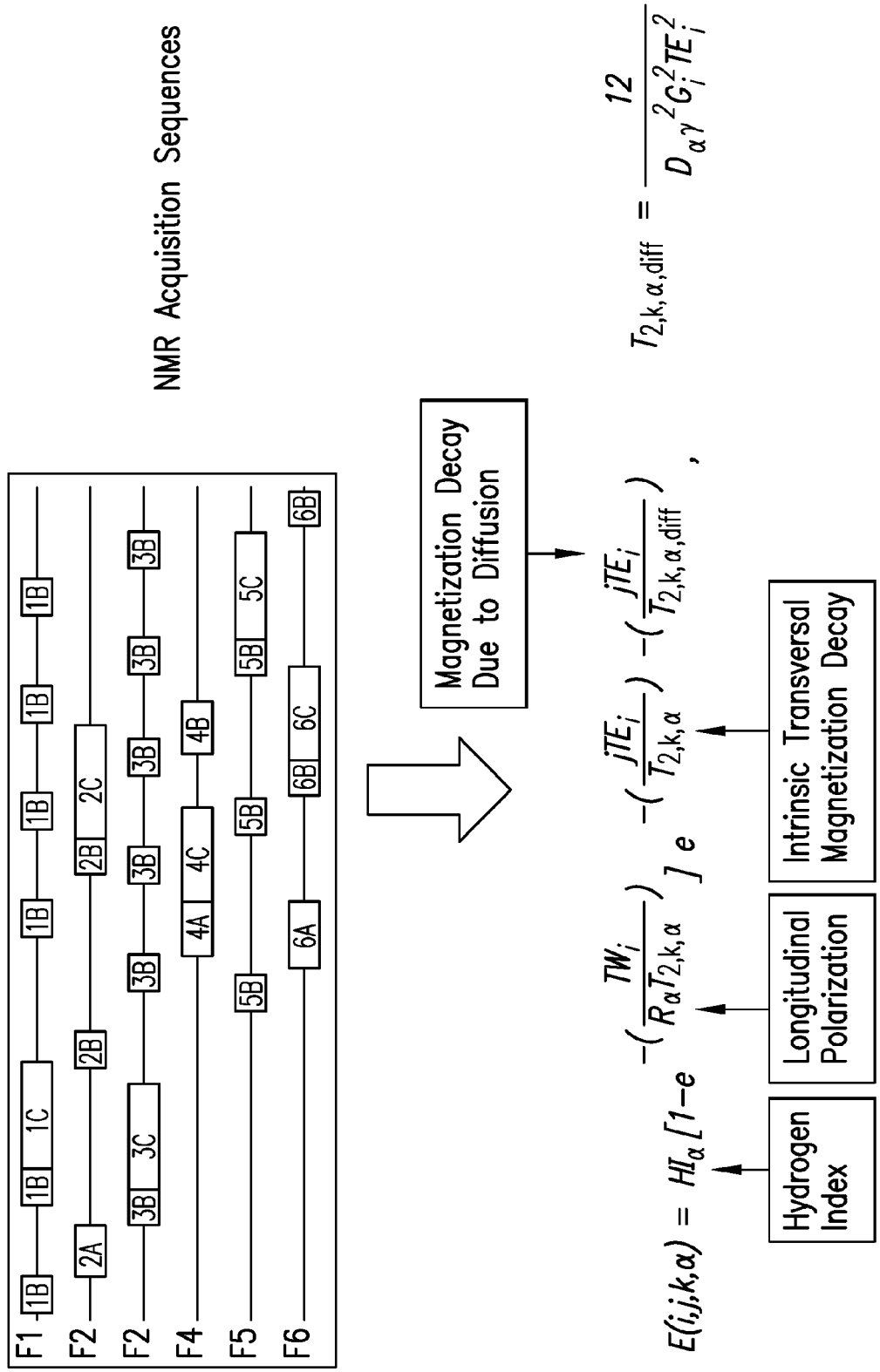
FIG. 6 depicts aspects of NMR forward modeling responses due to NMR acquisition sequences.

FIG. 6 depicts aspects of NMR forward modeling responses in the lower part of the figure for the NMR acquisition sequences depicted in the upper part of the figure. The experiment parameters for each of the sequences are presented in Table 2 below.

Figure 7:
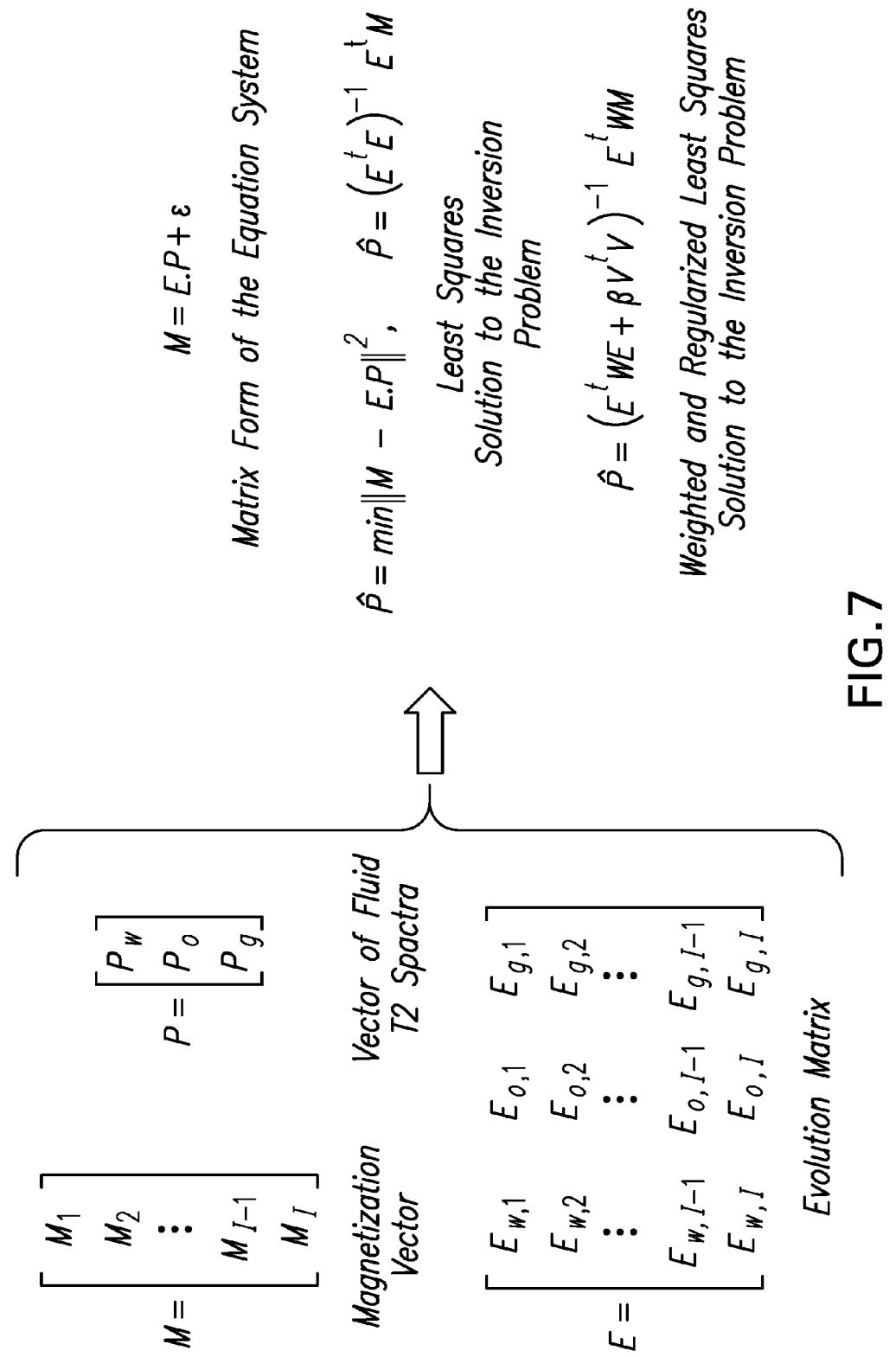
FIG. 7 depicts aspects of NMR T2 intrinsic spectra for each of oil, gas and water obtained from inversion.

FIG. 7 depicts aspects of NMR T2 intrinsic spectra (i.e., T2 spectra for each of oil, gas and water) obtained from inversion. The equation to be inverted is of the form $M = E \cdot P + \varepsilon$ where each of the terms is represented by a matrix. Also depicted are embodiments of a least squares solution and a weighted and regularized least squares solution. The forward model is mathematically represented by a forward matrix. When the model is time related, the matrix may be referred to as an evolution matrix.

FIG. 8 depicts aspects of accounting for non-NMR measurements in the evolution matrix E. In this case, the magnetization matrix M also includes the non-NMR measurements.

Methods for simultaneous inversion of NMR multiple echo trains and conventional logs are discussed in more detail next. Currently the NMR inversion is typically done using only NMR data and petrophysical analysis takes the inversion output as raw data. Most of the time the vertical resolution does not match or some NMR results as CBW, BVI or PHE are taken as true when in fact they may be different. The NMR depth of investigation is similar to the porosity conventional tools but it is not similar to resistivity tools. Parameters of fluids will be necessary for 1D inversion and matrix parameters will be necessary for penalty equations.

Vertical resolution is discussed next. The NMR vertical resolution must be matched to the conventional (i.e., non-NMR) logs. In the current inversion process the echo trains are stacked until the "CHI" is below 2 pu. That is a good procedure considering only NMR data. The same CLS (constrained least squares) eleven points filter used in conventional logs will be applied to the echoes in place of stacking. The desired CHI must be achieved selecting the proper logging speed. The normal weights of the CLS eleven points filter are in Table 1. A stacking of two samples will be necessary for echoes with alternating phase.

TABLE 1

| −5 | −4 | −3 | −2 | −1 | 0 | 1 | 2 | 3 | 4 | 5 |
|---|---|---|---|---|---|---|---|---|---|---|
| 0.0059 | 0.0298 | 0.0735 | 0.1266 | 0.1704 | 0.1875 | 0.1704 | 0.1266 | 0.0735 | 0.0298 | 0.0059 |

NMR Tool response and inversion of a single echo train are discussed next. NMR T2 spectrum, from now on F(T2), is a rock property dependent of the experiment wherein different experiment parameters produce different spectra. Standard spectra are represented in a semi log graph using log(T2) as the x-axis. From now on all integral equations along T2 are in fact along log(T2).

For each differential of T2 (see FIG. 3), the NMR tool responds with a time exponential function de(t). Equation 1 represents the whole spectrum of the tool response. The tool makes a transform from the T2 domain to time domain through a pulse sequence as illustrated in FIG. 4.

$$e(t) = \int_0^\infty F(T2) \cdot \exp\left(-\frac{t}{T2}\right) \cdot dT2 + \epsilon(t) \quad (1)$$

$$e(t) = \mathcal{L}[F(T2)]$$

The term $\epsilon(t)$ is the measure noise, fundamentally thermal noise in the antenna. It can be seen that $L[F(T2)]$ is a linear transform shown Equation 2.

$$L[a \cdot G(T2) + b \ H(T2)] = a \cdot L[G(T2)] + b \cdot [H(T2)] \quad (2)$$

Using a sum of nB weighted exponential functions $\exp(-t/T_{2i})$ with fixed time constant $T_{2i}$ to approximate the echo train, the weights found $B_i$ with $i \in (1, \ldots, nB)$ can be used as weights of nB functions of T2 to get the spectrum from the echo train.

If exponential functions are used in time domain, delta Dirac functions must be used in T2 domain because $L[\delta(T2-T_{2i})] = \exp(-t/T_{2i})$.

Solving the inversion of a single echo train with nE echoes consist in to solve nE linear equations (see Equations 3).

$$\begin{cases} B_1 \exp(-t_1/T2_1) + \ldots + B_n \exp(-t_1/T2_n) + \ldots + B_{nB} \exp(-t_1/T2_{nB}) = E_1 \\ \ldots \quad \ldots \quad = \cdot \\ \quad + B_n \exp(-t_i/T2_n) + \quad \ldots \quad = E_i \\ \ldots \quad \ldots \quad = \cdot \\ B_1 \exp(-t_{nE}/T2_1) + \ldots + B_n \exp(-t_{nE}/T2_n) + \ldots + B_{nB} \exp(-t_{nE}/T2_{nB}) = E_{nE} \end{cases} \quad (3)$$

This is a very ill conditioned system. As an example, for nE=500; nB=28 and TE=0.6 the condition number of the matrix A in Equation 4 is 1.2592e+016.

$$A = \begin{bmatrix} \exp(-t_1/T2_1) & \ldots & \exp(-t_1/T2_n) & \ldots & \exp(-t_1/T2_{nB}) \\ \ldots & & \ldots & & \ldots \\ \ldots & & \exp(-t_i/T2_n) & & \ldots \\ \ldots & & \ldots & & \ldots \\ \exp(-t_{nE}/T2_1) & \ldots & \exp(-t_{nE}/T2_n) & \ldots & \exp(-t_{nE}/T2_{nB}) \end{bmatrix} \quad (4)$$

$$B = \begin{bmatrix} B_1 \\ \vdots \\ B_n \\ \vdots \\ B_{nB} \end{bmatrix} ; E = \begin{bmatrix} E_1 \\ \vdots \\ E_i \\ \vdots \\ E_{nE} \end{bmatrix}$$

Solving the system require regularization to get stable solutions. Using minimum norm regularization with a factor $\beta$ and least squares, the solution is in Equation 5.

$$B = (A^T \cdot A + \beta^2 \cdot I)^{-1} \cdot A^T \cdot E \quad (5)$$

The echo train approximation is given by Equation 6 and an example is in FIG. 5.

$$FIT = A \cdot B \quad (6)$$

Figure 9:
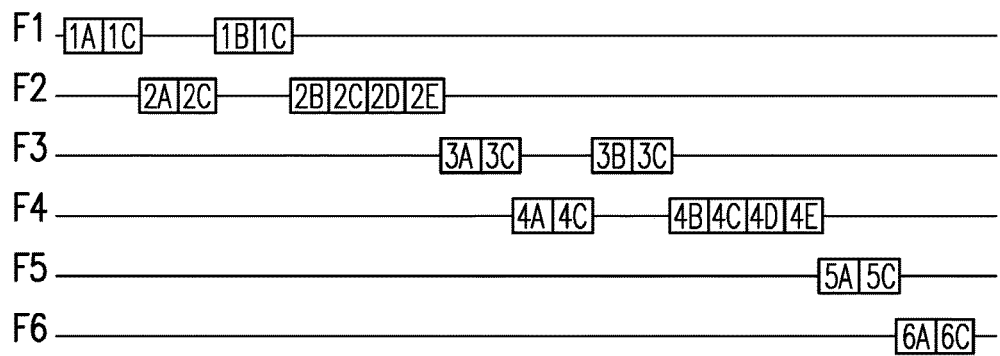
FIG. 9 depicts aspects of twenty four NMR experiments with different acquisition parameters performed by an NMR tool.

Inversion of multiple echo trains is discussed next. Current NMR data acquisitions may have several echo trains with different acquisition parameters. In one or more embodiments, they may have one echo train with the shorter available TE (inter-echo time) and short TW (wait time) for CBW and other echo train with long TW to get the whole spectrum. For example, an NMR tool with a gas acquisition mode may perform twenty four experiments with different acquisition parameters as illustrated in FIG. 9 with respect to the acquisition parameters listed in Table 2. NE is the number of echoes acquired. TE is the time between echoes. TW is the time between the last echo of one experiment to the first one of the next experiment. Frequency is in MHz.

TABLE 2

| | FREQ | TE [μSec] | TW [mSec] | nE |
|---|---|---|---|---|
| 2A | 961.77 | 600 | 8302 | 690 |
| 2C | 961.77 | 400 | 20 | 25 |
| 2B | 961.77 | 600 | 983 | 690 |
| 2C | 961.77 | 400 | 20 | 25 |
| 2D | 961.77 | 400 | 50 | 25 |
| 2E | 961.77 | 400 | 100 | 25 |
| 4A | 858.52 | 600 | 8302 | 690 |
| 4C | 858.52 | 400 | 20 | 25 |
| 4B | 858.52 | 600 | 983 | 690 |
| 4C | 858.52 | 400 | 20 | 25 |
| 4D | 858.52 | 400 | 50 | 25 |
| 4E | 858.52 | 400 | 100 | 25 |

TABLE 2-continued

| | FREQ | TE [μSec] | TW [mSec] | nE |
|---|---|---|---|---|
| 1A | 767.77 | 600 | 9222 | 690 |
| 1C | 767.77 | 400 | 20 | 25 |
| 1B | 767.77 | 600 | 983 | 690 |
| 1C | 767.77 | 400 | 20 | 25 |
| 3A | 688.38 | 600 | 9222 | 690 |
| 3C | 688.38 | 400 | 20 | 25 |
| 3B | 688.38 | 600 | 983 | 690 |
| 3C | 688.38 | 400 | 20 | 25 |
| 5A | 613.72 | 600 | 11097 | 690 |
| 5C | 613.72 | 400 | 20 | 25 |
| 6A | 555.27 | 600 | 11097 | 25 |
| 6C | 555.27 | 400 | 20 | 25 |

The main objectives of the multiple echo train inversion are typify and quantify fluids in the measured zone and to use the volume of fluids to correct the porosity by hydrogen index. The challenge is to get stable and reliable solutions. As disclosed herein, stable and reliable solutions are obtained by inverting the echo train twice. The first time to get the apparent T2 spectrum and the second time to get one intrinsic spectrum for each fluid, using the apparent spectrum obtained in the first run as penalty equations, in place of normal regularization. To include conventional logs in the inversion, it is necessary to add the matrix volume as an unknown and an equation where weight·Σunknowns=weight with a large weight.

Computing apparent T2 spectrum is discussed next. In a multiple echo train acquisition, there are experiments with different G·TE and different TW. To invert echo trains with different G·TE together, only one fluid will be considered present with a diffusion constant near to the diffusion constant of water.

To invert echo trains with different TWs, joint inversion will be used. Unknowns corresponding to a T2<TW/3 for each echo train will be shared by all the echo trains. The space of unknowns will be extended until unknowns corresponding to 2=3·TW. Unknowns corresponding to TW/3<T2<3·TW will be spaced twice than ones corresponding to T2<TW/3 and being auxiliary solutions.

In the example of FIG. 8, there are experiments with TW=20, TW=50, TW=100 and TW=983. Choosing 0.5/√2 as first bin and 28 bins total, the exponential base functions have time constants as given in Table 3, the bracketed T2 are in the range TW/3<T2<3·TW. The signals for this 2 range are not totally polarized and the corresponding functions being base of auxiliary unknowns.

TABLE 3

BINS for different waiting times.

| Long TW | TW = 20 | TW = 50 | TW = 100 | TW = 983 |
|---|---|---|---|---|
| 0.35 | 0.35 | 0.35 | 0.35 | 0.35 |
| 0.50 | 0.50 | 0.50 | 0.50 | 0.50 |
| 0.71 | 0.71 | 0.71 | 0.71 | 0.71 |
| 1.00 | 1.00 | 1.00 | 1.00 | 1.00 |
| 1.41 | 1.41 | 1.41 | 1.41 | 1.41 |
| 2.00 | 2.00 | 2.00 | 2.00 | 2.00 |
| 2.83 | 2.83 | 2.83 | 2.83 | 2.83 |
| 4.00 | 4.00 | 4.00 | 4.00 | 4.00 |
| 5.66 | 5.66 | 5.66 | 5.66 | 5.66 |
| 8.00 | 8.00 | 8.00 | 8.00 | 8.00 |
| 11.31 | 16.00 | 11.31 | 11.31 | 11.31 |
| 16.00 | 32.00 | 16.00 | 16.00 | 16.00 |
| 22.63 | 64.00 | 22.63 | 22.63 | 22.63 |
| 32.00 |  | 45.25 | 32.00 | 32.00 |
| 45.25 |  | 90.51 | 45.25 | 45.25 |
| 64.00 |  | 181.02 | 90.51 | 64.00 |
| 90.51 |  |  | 181.02 | 90.51 |
| 128.00 |  |  | 362.04 | 128.00 |
| 181.02 |  |  |  | 181.02 |
| 256.00 |  |  |  | 256.00 |
| 362.04 |  |  |  | 362.04 |
| 512.00 |  |  |  | 724.08 |
| 724.08 |  |  |  | 1448.15 |
| 1024.00 |  |  |  | 2896.31 |
| 1448.15 |  |  |  |  |
| 2048.00 |  |  |  |  |
| 2896.31 |  |  |  |  |
| 4096.00 |  |  |  |  |

To resolve all experiments together, a data vector is created concatenating all echo trains, Equation 7. Assuming k experiments, each of them has an echo train Ej, j∈ (1, . . . , k) with nEj echoes. The data vector thus created has $$\sum_{j=1}^{k} nE_j$$

elements.

$$E = \begin{bmatrix} E_1 \\ \vdots \\ E_j \\ \vdots \\ E_k \end{bmatrix} \quad (7)$$

The unknowns will be divided in main and auxiliary. The main unknowns will be share by all experiments in the range T2<TW/3. The auxiliary ones will be share by experiments with same TW in the range TW/3<T2<3·TW.

The main unknowns are defined by the first bin, the increment and number of bins. In the example of FIG. 8 with respect to Table 3, the main unknowns in the first column have a first bin at 2=0.35, an increment of 42 and 28 bins. The first bin and the number of bins may be selected to cover all possible T2, Equation 8.

$$B = \begin{bmatrix} B_1 \\ \vdots \\ B_{nB} \end{bmatrix} \quad (8)$$

It will require many sets of auxiliary unknowns as there different short TWs. Reducing the number of unknowns in a twofold increment is elected for them, Equation 9.

$$B_m = \begin{bmatrix} B_{m_1} \\ \vdots \\ B_{m_{nBm}} \end{bmatrix} \quad (9)$$

$$m \in (1, \ldots, nTWS)$$

$$nTWS = \# \text{ short } TWs$$

A vector of extended unknowns is created concatenating the main unknowns and all set of auxiliary ones, Equation 10.

$$B^* = \begin{bmatrix} B \\ B_1 \\ \vdots \\ B_{nTWS} \end{bmatrix} \quad (10)$$

Posing a least squares problem, Equation 11, the forward matrix results as Equation 12, all 0 are zero matrices with the necessary dimension to fill A.

$$A \cdot B^* = E \quad (11)$$

$$A = \begin{bmatrix} A_l & & & & 0 & & \\ \vdots & & & & & & \\ A_l & & & & & & \\ A_l & 0 & D_l & 0 & \cdots & 0 & 0 \\ \vdots & \vdots & \vdots & \vdots & \ddots & \vdots & \vdots \\ A_l & 0 & D_l & 0 & \cdots & 0 & 0 \\ A_l & 0 & 0 & D_l & \cdots & 0 & 0 \\ \vdots & \vdots & \vdots & \vdots & \ddots & \vdots & \vdots \\ A_l & 0 & 0 & D_l & \cdots & 0 & 0 \\ \vdots & \vdots & \vdots & \vdots & \ddots & \vdots & \vdots \\ A_l & 0 & 0 & 0 & \cdots & 0 & D_l \\ \vdots & \vdots & \vdots & \vdots & \ddots & \vdots & \vdots \\ A_l & 0 & 0 & 0 & \cdots & 0 & D_l \end{bmatrix} \quad (12)$$

$$l \in (1, \ldots, k)$$

The $A_l$ sub matrices are created as Equation 13. The term nBm is the number of bins of the partial polarized experiment m such that the corresponding T2 are less than TW/3.

$$A_i = \begin{bmatrix} \exp(-t_1^l/T2_1) \cdot D(t_1^l) & \cdots & \exp(-t_1^l/T2_n) \cdot D(t_1^l) & \cdots & \exp(-t_1^l/T2_{nB_m}) \cdot D(t_1^l) \\ \cdots & & \cdots & & \cdots \\ \cdots & & \exp(-t_i^l/T2_n) \cdot D(t_i^l) & & \cdots \\ \cdots & & \cdots & & \cdots \\ \exp(-t_{nE}^l/T2_1) \cdot D(t_{nE}^l) & \cdots & \exp(-t_{nE}^l/T2_n) \cdot D(t_{nE}^l) & \cdots & \exp(-t_{nE}^l/T2_{nB_m}) \cdot D(t_{nE}^l) \end{bmatrix} \quad (13)$$

$$D(t_i^l) = \exp\left(\frac{-\gamma^2 \cdot D_w^2 \cdot (G_f^2 \cdot TE_f^2 - G_l^2 \cdot TE_l^2)}{12} \cdot t_i^l\right)$$

The $D_l$ sub matrices have the same structure than Equation 13 but T2 are restricted to $TW/3 < T2 < 3 \cdot TW$.

Weighting is discussed next. To take account the difference of noise between experiments, a weighting matrix W is applied to Equation 11. W is a diagonal matrix with the elements equal to the inverse of power two of the standard deviation of each experiment, Equation 14.

$$W = \begin{bmatrix} \sigma_1^{-2} \cdot 1_1 & 0 & 0 & 0 & 0 \\ 0 & \cdot & 0 & 0 & 0 \\ 0 & 0 & \sigma_j^{-2} \cdot 1_j & 0 & 0 \\ 0 & 0 & 0 & \cdot & 0 \\ 0 & 0 & 0 & 0 & \sigma_k^{-2} \cdot 1_k \end{bmatrix} \quad (14)$$

$1_j$ is the identity matrix with size($1_j$)=$nE_j$ and $\sigma_j$ is the standard deviation of the channel Y after phase rotation.

Regularization and final result are discussed next. Different tests showed that the most stable results are obtained regularizing only the main unknowns using minimum norm regularization. Changing the identity matrix leaving ones only in places corresponding to the main unknowns and calling 1* to the modified identity matrix, the solution of the weighted and regularized least squares problem is Equation 15.

$$B^* = (A^T \cdot W \cdot A + \beta^2 \cdot 1^*)^{-1} \cdot A^T \cdot W \cdot E; \ B_j^* \geq 0, \ \forall j \quad (15)$$

Assuming k experiments and calling $ST_i$ to the first element of the experiment i, the fit of all experiments is Equation 16. The fit of each echo train are sub arrays of FIT, the fit of the echo train i is $FIT_i$=FIT($ST_i$:$ST_i$+$nE_i$−1).

$$FIT = A \cdot B^* \quad (16)$$

For each i experiment, $i \in (1, \ldots, k)$, a $CHI_i$ can be computed as equation 17.

$$CHI_i = \frac{\sum_{j=ST_i}^{ST_i+nE_i-1} (E_j - FIT_j)^2}{nE_i} \quad (17)$$

The first nB elements of B* are the T2 apparent spectrum PP, Equation 18.

$$PP = B^*(1:nB) \quad (18)$$

Computing intrinsic and hydrogen index (HI) corrected T2 spectrum assuming known fluids is discussed next. Knowing the type of fluids, the parameters of them can be estimated in function of the fluids property, pressure and temperature. These fluid parameters are used to construct a forward matrix that is able to resolve the T2 spectrum in three separate spectra, one for water, one for oil and other for gas. The sum of three is the intrinsic and HI corrected T2 because $D_{w,o,g}$, $HI_{w,o,g}$ and $R_{w,o,g}$ are known and included in the forward matrix.

The model includes all parameters is in equation 19. $T2_2$ is the T2 corresponding to the unknown j, time=n·TE, k number of experiments, $TE_i$ inter echo time of the experiment i, $TW_i$ waiting time of the experiment i, $G_i$ magnetic field gradient of the experiment i.

$$f_{w,o,g}^i(n, T2_j) = \quad (19)$$
$$HI_{w,o,g} \cdot \left[1 - \exp\left(-\frac{TW_i}{R_{w,o,g} \cdot T2_j}\right)\right] \cdot \exp\left(-\frac{n \cdot TE_i}{T2_j}\right) \cdot \exp\left(-\frac{n \cdot TE_i}{T2D_{w,o,g}}\right)$$

$$T2D_{w,o,g} = \frac{12}{D_{w,o,g} \cdot \gamma^2 \cdot G_i^2 \cdot TE^2}$$

$$i \in (1, \ldots, k)$$

The unknowns vector has three sets of bins, one for water, one for oil and other for gas. The range of three set of bins must cover all the possible values of T2 and normally they will be overlapped, Equation 20.

$$B = \begin{bmatrix} BW_1 \\ \vdots \\ BW_{nBW} \\ BO_1 \\ \vdots \\ BO_{nBO} \\ BG_1 \\ \vdots \\ BG_{nBG} \end{bmatrix} = \begin{bmatrix} BW \\ BO \\ BG \end{bmatrix} \qquad (20)$$

The apparent T2 spectrum is included in the data vector E and each T2 has three corresponding intrinsic T2, related to different fluids (see FIG. 7). Each bin of the apparent spectrum PP, in the tail of the data vector (Equation 21), is the sum of three different fluid bins at the intrinsic T2 value, according to Equation 22.

$$E = \begin{bmatrix} E_1 \\ \vdots \\ E_j \\ \vdots \\ E_k \\ PP \end{bmatrix} \qquad (21)$$

$$T2^{int}_{w,o,g} = \frac{1}{\frac{1}{T2} - \frac{1}{T2D_{w,o,g}}} \qquad (22)$$

The A2I matrix with nB rows and nBW+nBO+nBG columns relates the apparent T2 spectrum to the vector of unknowns B, its rows have three ones, one for each fluid, on the T2 given by Equation 22. If T2 does not have the exact value of some bin, it is divided between the two adjacent bins, according to the distance to them.

For each experiment i of k experiments and for each fluid, a matrix $A^i_{w,o,g}$ is defined by the equations 19 and 23.

$$A^i_{w,o,g} = \qquad (23)$$

$$\begin{bmatrix} f^i_{w,o,g}(1,T2_1) & \ldots & f^i_{w,o,g}(1,T2_j) & \ldots & f^i_{w,o,g}(1,T2_{nB_{w,o,g}}) \\ \vdots & & \ldots & & \vdots \\ \ldots & & f^i_{w,o,g}(m,T2_j) & & \ldots \\ \vdots & & \ldots & & \vdots \\ f^i_{w,o,g}(nE_i,T2_1) & \ldots & f^i_{w,o,g}(nE_i,T2_j) & \ldots & f^i_{w,o,g}(nE_i,T2_{nB_{w,o,g}}) \end{bmatrix}$$

The forward matrix A is formed by the lately defined sub-matrices, Equation 24.

$$A = \begin{bmatrix} A^1_w & A^1_o & A^1_g \\ \vdots & \vdots & \vdots \\ A^l_w & A^l_o & A^l_g \\ \vdots & \vdots & \vdots \\ A^k_w & A^k_o & A^k_g \\ \hline & A2I & \end{bmatrix} \qquad (24)$$

Weighting is discussed next. An nB size diagonal matrix is added to the weighting matrix defined in the equation 14 giving Equation 25. K must be long enough to get a stable solution. $1_B$ is an identity matrix of size nB.

$$W = \begin{bmatrix} \sigma_1^{-2} \cdot 1_1 & 0 & 0 & 0 & 0 & 0 \\ 0 & \cdot & 0 & 0 & 0 & 0 \\ 0 & 0 & \sigma_j^{-2} \cdot 1_j & 0 & 0 & 0 \\ 0 & 0 & 0 & \cdot & 0 & 0 \\ 0 & 0 & 0 & 0 & \sigma_k^{-2} \cdot 1_k & 0 \\ 0 & 0 & 0 & 0 & 0 & K \cdot 1_B \end{bmatrix} \qquad (25)$$

No need for regularization and final result are discussed next. No regularization is needed because the condition number of the matrix is small enough with the proper K, Equation 26.

$$B = (A^T \cdot W \cdot A)^{-1} W \cdot A^T \cdot E \qquad (26)$$

$B(1:nB_w)$ is the water intrinsic T2 spectrum, $B(nB_w+1:nB_w+nB_o)$ is the oil intrinsic T2 spectrum and $B(nB_w+nB_o+1:nB_w+nB_o+nB_g)$ is the intrinsic gas T2 spectrum, the three corrected by hydrogen index. The total spectrum is computed summing bins with the same associated T2.

Adding conventional non-NMR curves to the inversion is discussed next. Assuming a total porosity petrophysical model only, resistivity logs do not respond to the matrix. They may be added without changes in the unknowns vector but to add other logs as density or acoustic the matrix volume must be added to it, Equation 27.

$$B = \begin{bmatrix} BW_1 \\ \vdots \\ BW_{nBW} \\ BO_1 \\ \vdots \\ BO_{nBO} \\ BG_1 \\ \vdots \\ BG_{nBG} \\ V_m \end{bmatrix} = \begin{bmatrix} BW \\ BO \\ BG \\ V_m \end{bmatrix} \qquad (27)$$

$$\sum_{i=1}^{nBW} BW_i + \sum_{i=1}^{nBO} BO_i + \sum_{i=1}^{nBG} BG_i + V_m = 1$$

In the data vector, the square root of conductivity, other conventional curves and one representing the sum of all unknowns are added, Equation 28.

$$E = \begin{bmatrix} E_1 \\ \vdots \\ E_j \\ \vdots \\ E_k \\ \sqrt{C} \\ \rho \\ \Delta t \\ \vdots \\ 1 \\ PP \end{bmatrix} \quad (28)$$

The forward or evolution matrix thus becomes Equation 29.

$$A = \begin{bmatrix} A^1_w & A^1_o & A^1_g & 0 \\ \vdots & \vdots & \vdots & \vdots \\ A^l_w & A^l_o & A^l_g & 0 \\ \vdots & \vdots & \vdots & \vdots \\ A^k_w & A^k_o & A^k_g & 0 \\ \sqrt{C_w} & 0 & 0 & 0 \\ \rho_w & \rho_o & \rho_g & \rho_m \\ \Delta t_w & \Delta t_o & \Delta t_g & \Delta t_m \\ \vdots & \vdots & \vdots & \vdots \\ 1 & 1 & 1 & 1 \end{bmatrix}$$

A2I

Weighting for conventional logs is discussed next. The weighting factors for the conventional curves will be user defined parameters. The weight for the sum of unknowns $W_S$ is generally a large number, Equation 30.

$$W = \begin{bmatrix} \sigma_1^{-2} \cdot 1_1 & 0 & 0 & 0 & 0 & 0 & 0 & 0 & 0 & 0 & 0 \\ 0 & \cdot & 0 & 0 & 0 & 0 & 0 & 0 & 0 & 0 & 0 \\ 0 & 0 & \sigma_j^{-2} \cdot 1_j & 0 & 0 & 0 & 0 & 0 & 0 & 0 & 0 \\ 0 & 0 & 0 & \cdot & 0 & 0 & 0 & 0 & 0 & 0 & 0 \\ 0 & 0 & 0 & 0 & \sigma_k^{-2} \cdot 1_k & 0 & 0 & 0 & 0 & 0 & 0 \\ 0 & 0 & 0 & 0 & 0 & W_C & 0 & 0 & 0 & 0 & 0 \\ 0 & 0 & 0 & 0 & 0 & 0 & W_D & 0 & 0 & 0 & 0 \\ 0 & 0 & 0 & 0 & 0 & 0 & 0 & W_A & 0 & 0 & 0 \\ 0 & 0 & 0 & 0 & 0 & 0 & 0 & 0 & W_S & 0 & 0 \\ 0 & 0 & 0 & 0 & 0 & 0 & 0 & 0 & 0 & \cdot & 0 \\ 0 & 0 & 0 & 0 & 0 & 0 & 0 & 0 & 0 & 0 & K \cdot 1_B \end{bmatrix} \quad (30)$$

No regularization is applied but the factor K in the apparent T2 spectrum plays a role in W other than the regularization factor. Equation 26 resolves the system. Penalty equations are additional equations that minimize some value related to the unknowns. When penalty equations are used to reduce the condition number of the system of equations, the procedure is called regularization. A high condition number characterizes ill conditioned systems. In this particular case, the penalty value is the norm of the vector of unknowns. To minimize the norm as many penalty equations as unknowns are added to the system ($\beta^2 \cdot I$ in equation 5 using matrix notation). The procedure is called minimum norm regularization.

Figure 10:
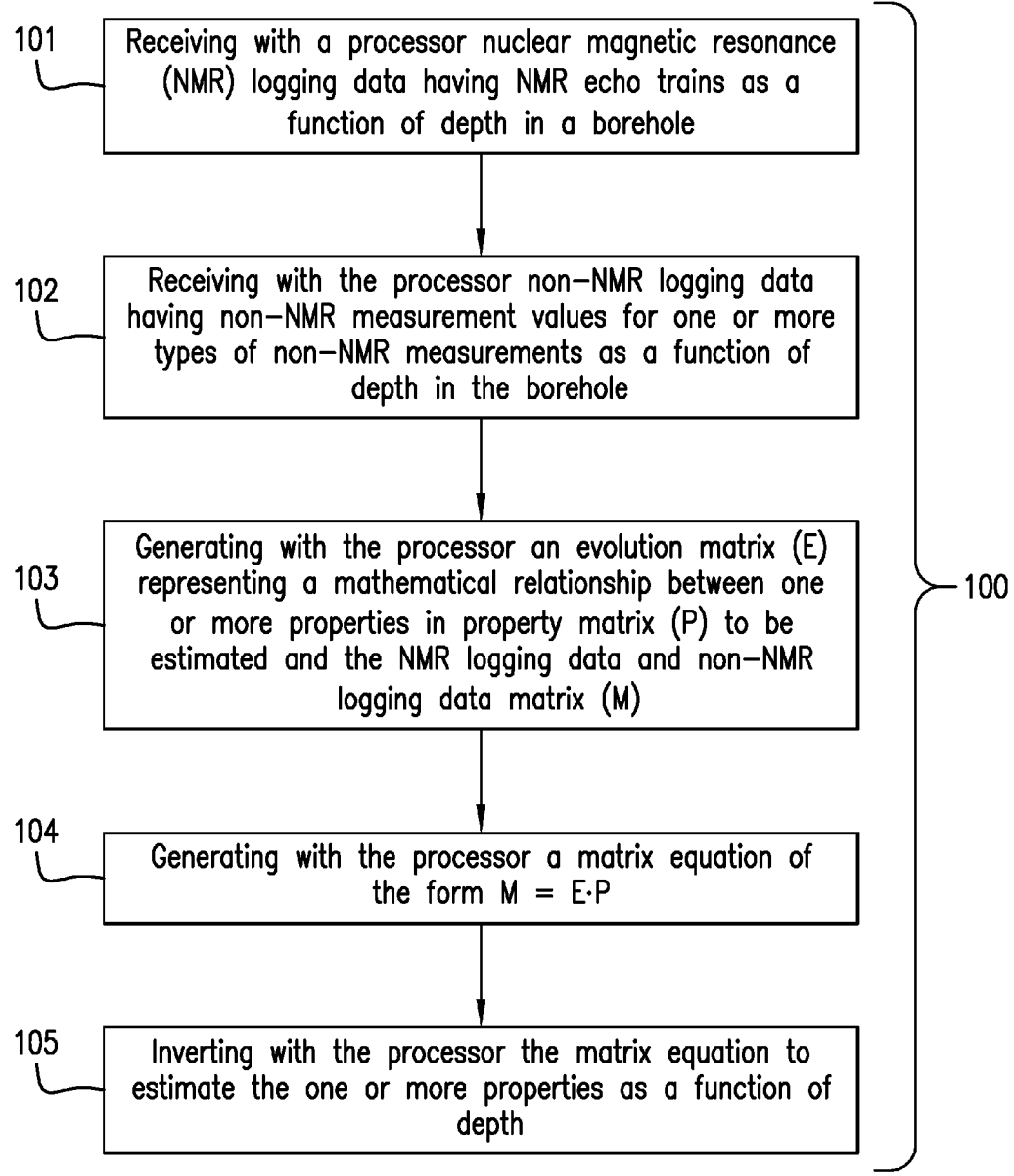
FIG. 10 is a flow chart for a method for estimating one or more properties as a function of depth of an earth formation penetrated by a borehole.

FIG. 10 is a flow chart for a method 100 for estimating one or more properties as a function of depth of an earth formation penetrated by a borehole. Non-limiting embodiments of the one or more properties includes at least one selection from a group consisting of porosity, water volume, oil volume, gas volume, permeability, fluid viscosity, grain size and capillary pressure. Block 101 calls for receiving with a processor nuclear magnetic resonance (NMR) logging data having NMR echo trains as a function of depth in the borehole. The NMR logging data is obtained using an NMR tool conveyed through the borehole by a carrier. The NMR echo trains include NMR information such as a spectrum of T2 values, diffusion constant D, and/or T1/T2 ratio R. Block 102 calls for receiving with the processor non-NMR logging data having non-NMR measurement values for one or more types of non-NMR measurements as a function of depth in the borehole. The non-NMR logging data is obtained using a non-NMR logging tool conveyed through the borehole by a carrier. Non-limiting embodiments of the non-NMR logging data include at least one selection from a group comprising acoustic logging data, density logging data, neutron logging data, resistivity logging data and natural gamma-ray logging data.

Block 103 calls for generating with the processor an evolution matrix (E) representing a mathematical relationship between the one or more properties in the property matrix (P) to be estimated and the NMR logging data and non-NMR logging data matrix (M).

Block 104 calls for generating with the processor a matrix equation of the form M=E·P. In one or more embodiments, the matrix equation further includes a term ($\varepsilon$) representing noise in a received signal with the form of the matrix equation being M=E·P+$\varepsilon$.

Block 105 calls for inverting with the processor the matrix equation to estimate the one or more properties as a function of depth. In one or more embodiments, inverting includes obtaining a weighted least squares solution of the matrix equation using a weighting matrix. In one or more embodiments, the weighting matrix includes a diagonal matrix with elements equal to an inverse power of two of a standard deviation of each measurement.

The method 100 may also include inverting with the processor the matrix equation to estimate the one or more properties as a function of depth. In one or more embodiments, the hydrocarbon production-related action includes perforating a casing lining the borehole at a selected depth using a perforation tool. In one or more embodiments, the hydrocarbon production-related action includes hydraulically fracturing the earth formation at a selected depth.

Embodiment 1

A method for estimating one or more properties as a function of depth of an earth formation penetrated by a borehole, the method comprising: receiving with a processor nuclear magnetic resonance (NMR) logging data comprising NMR echo trains as a function of depth in the borehole; receiving with the processor non-NMR logging data comprising non-NMR measurement values for one or more types of non-NMR measurements as a function of depth in the borehole; generating with the processor an evolution matrix (E) representing a mathematical relationship between the one or more properties in property matrix (P) to be estimated and the NMR logging data and non-NMR logging data matrix (M); generating with the processor a matrix equation of the form M=E·P; and inverting with the processor the matrix equation to estimate the one or more properties as a function of depth.

Embodiment 2

The method according to any prior embodiment, further comprising performing a hydrocarbon production-related action using hydrocarbon production-related apparatus and the one or more estimated properties as a function of depth.

Embodiment 3

The method according to any prior embodiment, wherein the hydrocarbon production-related action comprises perforating a casing lining the borehole at a selected depth using a perforation tool.

Embodiment 4

The method according to any prior embodiment, wherein the hydrocarbon production-related action comprises hydraulically fracturing the earth formation at a selected depth.

Embodiment 5

The method according to any prior embodiment, wherein the matrix equation further comprises a term ($\varepsilon$) representing noise in a received signal with the form of the matrix equation being M=E·P+$\varepsilon$.

Embodiment 6

The method according to any prior embodiment, wherein the one or more properties comprises at least one selection from a group consisting of porosity, water volume, oil volume, gas volume, permeability, fluid viscosity, grain size and capillary pressure.

Embodiment 7

The method according to any prior embodiment, wherein the non-NMR logging data comprises at least one selection from a group comprising acoustic logging data, density logging data, neutron logging data, resistivity logging data and natural gamma-ray logging data.

Embodiment 8

The method according to any prior embodiment, wherein inverting comprises obtaining a weighted least squares solution of the matrix equation using a weighting matrix.

Embodiment 9

The method according to any prior embodiment, wherein the weighting matrix comprises a diagonal matrix with elements equal to an inverse power of two of a standard deviation of each measurement.

Embodiment 10

A system for estimating one or more properties as a function of depth of an earth formation penetrated by a borehole, the system comprising: a carrier configured to be conveyed through the borehole; a nuclear magnetic resonance (NMR) logging tool disposed on the carrier and configured to provide NMR logging data comprising NMR echo trains as a function of depth in the borehole; a non-NMR tool disposed on the carrier and configured to provide non-NMR logging data comprising non-NMR measurement values for one or more types of non-NMR measurements as a function of depth in the borehole; and a processor configured to: receive the NMR logging data; receive the non-NMR logging data; generate an evolution matrix (E) representing a mathematical relationship between the one or more properties (P) to be estimated and the NMR logging data and non-NMR logging data (M); generate a matrix equation of the form M=E·P; and invert the matrix equation to estimate the one or more properties as a function of depth.

Embodiment 11

The system according to any prior embodiment, further comprising hydrocarbon production-related apparatus configured to perform a hydrocarbon production-related action using the one or more estimated properties as a function of depth.

Embodiment 12

The system according to any prior embodiment, wherein the hydrocarbon production-related action comprises perforating a casing lining the borehole at a selected depth using a perforation tool.

Embodiment 13

The system according to any prior embodiment, wherein the hydrocarbon production-related action comprises hydraulically fracturing the earth formation at a selected depth.

Embodiment 14

The system according to any prior embodiment, wherein the matrix equation further comprises a term ($\varepsilon$) representing noise in a received signal with the form of the matrix equation being M=E·P+$\varepsilon$.

Embodiment 15

The system according to any prior embodiment, wherein the one or more properties comprises at least one selection from a group consisting of porosity, water volume, oil volume, gas volume, permeability, fluid viscosity, grain size and capillary pressure.

Embodiment 16

The system according to any prior embodiment, wherein the non-NMR logging data comprises at least one selection from a group comprising acoustic logging data, density logging data, neutron logging data, resistivity logging data and natural gamma-ray logging data.

Embodiment 17

The system according to any prior embodiment, wherein invert comprises obtain a weighted least squares solution of the matrix equation using a weighting matrix.

Embodiment 18

The system according to any prior embodiment, wherein the weighting matrix comprises a diagonal matrix with elements equal to an inverse power of two of a standard deviation of each measurement.

In support of the teachings herein, various analysis components may be used, including a digital and/or an analog system. For example, the NMR tool 10, the non-NMR tool 15, the downhole production tool 21, the hydraulic fracturing system 24 and/or the controller 25 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

The disclosure illustratively disclosed herein may be practiced in the absence of any element which is not specifically disclosed herein.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for performing a hydrocarbon production-related action based on estimating one or more properties as a function of depth of an earth formation penetrated by a borehole, the method comprising:
   receiving, by a processor, nuclear magnetic resonance (NMR) logging data comprising NMR echo trains as a function of depth in the borehole;
   receiving, by the processor, non-NMR logging data comprising non-NMR measurement values for one or more types of non-NMR measurements as a function of depth in the borehole;
   generating, by the processor, an evolution matrix (E) representing a mathematical relationship between the one or more properties in property matrix (P) to be estimated and the NMR logging data and non-NMR logging data matrix (M);
   generating, by the processor, a matrix equation of the form $M = E \cdot P$;
   inverting, by the processor, the matrix equation to estimate the one or more properties as a function of depth in the borehole; and
   performing the hydrocarbon production-related action using hydrocarbon production-related apparatus, wherein the one or more estimated properties as a function of depth in the borehole influences the performance of the hydrocarbon production-related action.

2. The method according to claim 1, wherein the hydrocarbon production-related action comprises perforating a casing lining the borehole at a selected depth using a perforation tool.

3. The method according to claim 1, wherein the hydrocarbon production-related action comprises hydraulically fracturing the earth formation at a selected depth.

4. The method according to claim 1, wherein the matrix equation further comprises a term ($\varepsilon$) representing noise in a received signal with the form of the matrix equation being $M=E \cdot P+\varepsilon$.

5. The method according to claim 1, wherein the one or more properties comprises at least one selection from a group consisting of porosity, water volume, oil volume, gas volume, permeability, fluid viscosity, grain size and capillary pressure.

6. The method according to claim 1, wherein the non-NMR logging data comprises at least one selection from a group comprising acoustic logging data, density logging data, neutron logging data, resistivity logging data and natural gamma-ray logging data.

7. The method according to claim 1, wherein inverting comprises obtaining a weighted least squares solution of the matrix equation using a weighting matrix.

8. The method according to claim 7, wherein the weighting matrix comprises a diagonal matrix with elements equal to an inverse power of two of a standard deviation of each measurement.

9. A system for performing a hydrocarbon production-related action based on estimating one or more properties as a function of depth of an earth formation penetrated by a borehole, the system comprising:
a carrier configured to be conveyed through the borehole;
a nuclear magnetic resonance (NMR) logging tool disposed on the carrier and configured to provide NMR logging data comprising NMR echo trains as a function of depth in the borehole;
a non-NMR tool disposed on the carrier and configured to provide non-NMR logging data comprising non-NMR measurement values for one or more types of non-NMR measurements as a function of depth in the borehole;
a processor configured to:
receive the NMR logging data;
receive the non-NMR logging data;
generate an evolution matrix (E) representing a mathematical relationship between the one or more properties (P) to be estimated and the NMR logging data and non-NMR logging data (M);
generate a matrix equation of the form $M=E \cdot P$; and
invert the matrix equation to estimate the one or more properties as a function of depth in the borehole;
hydrocarbon production-related apparatus configured to perform a hydrocarbon production-related action based on the one or more estimated properties as a function of depth in the borehole, wherein the one or more estimated properties as a function of depth in the borehole influences the performance of the hydrocarbon production-related action.

10. The system according to claim 9, wherein the hydrocarbon production-related action comprises perforating a casing lining the borehole at a selected depth using a perforation tool.

11. The system according to claim 9, wherein the hydrocarbon production-related action comprises hydraulically fracturing the earth formation at a selected depth.

12. The system according to claim 9, wherein the matrix equation further comprises a term ($\varepsilon$) representing noise in a received signal with the form of the matrix equation being $M=E \cdot P+\varepsilon$.

13. The system according to claim 9, wherein the one or more properties comprises at least one selection from a group consisting of porosity, water volume, oil volume, gas volume, permeability, fluid viscosity, grain size and capillary pressure.

14. The system according to claim 9, wherein the non-NMR logging data comprises at least one selection from a group comprising acoustic logging data, density logging data, neutron logging data, resistivity logging data and natural gamma-ray logging data.

15. The system according to claim 9, wherein invert comprises obtain a weighted least squares solution of the matrix equation using a weighting matrix.

16. The system according to claim 15, wherein the weighting matrix comprises a diagonal matrix with elements equal to an inverse power of two of a standard deviation of each measurement.

\* \* \* \* \*